(12) United States Patent
Moss

(10) Patent No.: US 10,775,146 B1
(45) Date of Patent: Sep. 15, 2020

(54) DISTANCE MEASUREMENT DEVICE

(71) Applicant: David Moss, Vero Beach, FL (US)

(72) Inventor: David Moss, Vero Beach, FL (US)

( * ) Notice: Subject to any disclaimer, the term of this patent is extended or adjusted under 35 U.S.C. 154(b) by 142 days.

(21) Appl. No.: 16/141,344

(22) Filed: Sep. 25, 2018

(51) Int. Cl.
  *G01B 3/1084* (2020.01)
  *G01C 1/00* (2006.01)

(52) U.S. Cl.
  CPC ............. *G01B 3/1084* (2013.01); *G01C 1/00* (2013.01)

(58) Field of Classification Search
  CPC .......... G01C 15/02; G01C 15/06; G01C 5/00; G01C 15/04; G01C 15/10; G01C 17/30; G01C 17/38; G01C 1/00; G01B 3/1003; G01B 3/1041; G01B 3/1061; G01B 3/1069; G01B 3/1084
  USPC ............................................. 33/755
  See application file for complete search history.

(56) References Cited

U.S. PATENT DOCUMENTS

| | | | | |
|---|---|---|---|---|
| 1,643,166 A | * | 9/1927 | Martin | G01B 3/1003 33/759 |
| 3,394,459 A | | 7/1968 | Grant | |
| 4,067,117 A | | 1/1978 | Bernard | |
| 5,230,158 A | * | 7/1993 | Wall | G01B 3/004 33/494 |
| 5,357,683 A | * | 10/1994 | Trevino | B25H 7/00 33/465 |
| D371,978 S | * | 7/1996 | Ekeoba | D10/71 |
| 5,915,810 A | * | 6/1999 | Cameron | G01B 3/08 33/295 |
| 6,049,990 A | * | 4/2000 | Holland | B43L 7/02 33/464 |
| D424,454 S | * | 5/2000 | Ikeda | D10/71 |
| 6,082,019 A | | 7/2000 | Lapp, Jr. et al. | |
| 6,085,434 A | * | 7/2000 | Mitchell | G01B 3/08 33/295 |
| 6,463,666 B1 | | 10/2002 | Szumer | |
| 6,470,582 B1 | * | 10/2002 | Renko | G01C 15/00 33/1 G |
| 6,568,092 B1 | | 5/2003 | Brien | |
| 6,732,445 B1 | | 5/2004 | Scoville | |
| 6,772,532 B1 | * | 8/2004 | Honea | G01B 3/1004 33/759 |
| D540,207 S | * | 4/2007 | Ikeda | 33/679.1 |
| 7,343,694 B2 | * | 3/2008 | Erdfarb | G01B 3/004 33/494 |

(Continued)

FOREIGN PATENT DOCUMENTS

| | | |
|---|---|---|
| CN | 2852051 | 12/2006 |
| CN | 101130327 | 2/2008 |

(Continued)

*Primary Examiner* — Yaritza Guadalupe-McCall
(74) *Attorney, Agent, or Firm* — Matthew M. Googe; Robinson IP Law, PLLC

(57) ABSTRACT

A measurement device for measuring a vertical distance between a first point and a second point includes: an elongate body extending from a first end to a second end that is distal from the first end; a leveling mechanism located at the second end of the elongate body, the leveling mechanism configured to orient the measurement device at two or more pre-determined angles relative to a vertical orientation of the measurement device; and two or more scales displaying units of measurement along a length of the elongate body. Units of measurement of each of the two or more scales correspond to a vertical distance between the first point and the second point.

11 Claims, 7 Drawing Sheets

(56) References Cited

U.S. PATENT DOCUMENTS

| | | | |
|---|---|---|---|
| 7,730,631 B2* | 6/2010 | Delaurier | G01B 3/1003 33/759 |
| 8,522,447 B1* | 9/2013 | Novotny | G01C 15/105 33/770 |
| 8,943,704 B1* | 2/2015 | Scammel | B25H 7/04 33/528 |
| 9,360,289 B2 | 6/2016 | Harris | |
| 9,651,348 B2* | 5/2017 | French | G01B 3/1003 |
| 2003/0126752 A1 | 7/2003 | Brandon et al. | |
| 2004/0172846 A1 | 9/2004 | McRae | |
| 2005/0016004 A1* | 1/2005 | Armstrong | G01C 15/004 33/286 |
| 2007/0079521 A1* | 4/2007 | Hill | G01B 3/08 33/809 |
| 2007/0234483 A1* | 10/2007 | Kunz | G01C 9/28 7/143 |
| 2008/0229601 A1* | 9/2008 | Lightfoot | G01B 3/08 33/700 |
| 2008/0271330 A1* | 11/2008 | Bender | A47G 1/205 33/365 |
| 2009/0188121 A1* | 7/2009 | Rabin | G01C 9/26 33/332 |
| 2012/0005908 A1* | 1/2012 | Rabin | G01C 9/34 33/301 |
| 2012/0102659 A1 | 5/2012 | Ingham | |
| 2012/0180330 A1 | 7/2012 | Noble | |
| 2016/0097625 A1* | 4/2016 | Dykes | G01C 9/34 33/701 |
| 2018/0021939 A1* | 1/2018 | Illingworth | B25H 7/02 33/354 |
| 2018/0023934 A1* | 1/2018 | Gjertsen | G01B 5/24 33/809 |

FOREIGN PATENT DOCUMENTS

| | | |
|---|---|---|
| DE | 19523740 | 1/1997 |
| DE | 19749026 | 5/1999 |
| EP | 2267406 | 12/2010 |
| JP | 2007249926 | 9/2007 |

* cited by examiner

DISTANCE MEASUREMENT DEVICE

FIELD

This disclosure relates to the field of measuring devices. More particularly, this disclosure relates to a device for measuring a distance between two points at varying angles.

BACKGROUND

Various measurement devices exist that enable measurement of a distance between two points. Rulers, tape measures, and other similar devices provide a simple means of measuring distance or length. However, many of these devices are only capable of measuring a linear distance and are incapable of determining a vertical distance between two points. Further, it may be difficult to align traditional measurement devices to achieve a vertical measurement, such as when measuring a distance between a pipe and a surface through a manhole cover.

What is needed, therefore, is a distance measurement device that enables measurement of a vertical distance between two points when the device is in one or more non-vertical orientations.

SUMMARY

The above and other needs are met by a distance measurement device that enables measurement of a vertical distance between two points when the device is in one or more non-vertical orientations. In a first aspect, a measurement device for measuring a vertical distance between a first point and a second point includes: an elongate body extending from a first end to a second end that is distal from the first end; a leveling mechanism located at the second end of the elongate body, the leveling mechanism configured to orient the measurement device at two or more pre-determined angles relative to a vertical orientation of the measurement device; two or more scales displaying units of measurement along a length of the elongate body, wherein units of measurement of each of the two or more scales correspond to a vertical distance between the first point and the second point.

In one embodiment, the elongate body has a rectangular cross-sectional area, the measurement device further including four scales displaying units of measurement on each side of the elongate body.

In another embodiment, the leveling mechanism includes four bubble levels with each of the four bubble levels displayed on a respective side of the measurement device. Each of the bubble levels corresponds to a particular angle of the measurement device.

In yet another embodiment, the measurement device further includes a sliding bracket slidably located around the elongate body of the measurement device. In one embodiment, the sliding bracket further includes a lock for fixing a position of the sliding bracket along a length of the elongate body of the measurement device.

In another embodiment, the elongate body further includes two or more members telescopically engaged with one another. The measurement device is movable between collapsed and extended positions. In yet another embodiment, the two or more scales are consecutively displayed on the two or more telescopically engaged members of the elongate body. In one embodiment, the measurement device further includes a lock extending through at least one of the two or more telescopically engaged members for fixing a position of the telescopically engaged members relative to one another. In another embodiment, in an extended position the measurement device has a length of from about 12 feet to about 18 feet.

In a second aspect, a measurement device for measuring a vertical distance between a first point and a second point includes: an elongate body extending from a first end to a second end that is distal from the first end, the elongate body comprising two or more members telescopically engaged with one another, wherein the measurement device is movable between collapsed and extended positions; a leveling mechanism located at the second end of the elongate body, the leveling mechanism configured to orient the measurement device at two or more pre-determined angles relative to a vertical orientation of the measurement device; two or more scales displaying units of measurement along a length of the elongate body, wherein units of measurement of each of the two or more scales correspond to a vertical distance between the first point and the second point and wherein the two or more scales are consecutively displayed on the two or more telescopically engaged members of the elongate body.

In one embodiment, the telescopically engaged members of the elongate body have rectangular cross-sectional areas, the measurement device further comprising four scales displaying units of measurement on each side of the telescopic members of the elongate body.

In another embodiment, the leveling mechanism includes four bubble levels with each of the four bubble levels displayed on a respective side of the measurement device, wherein each of the bubble levels corresponds to a particular angle of the measurement device.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
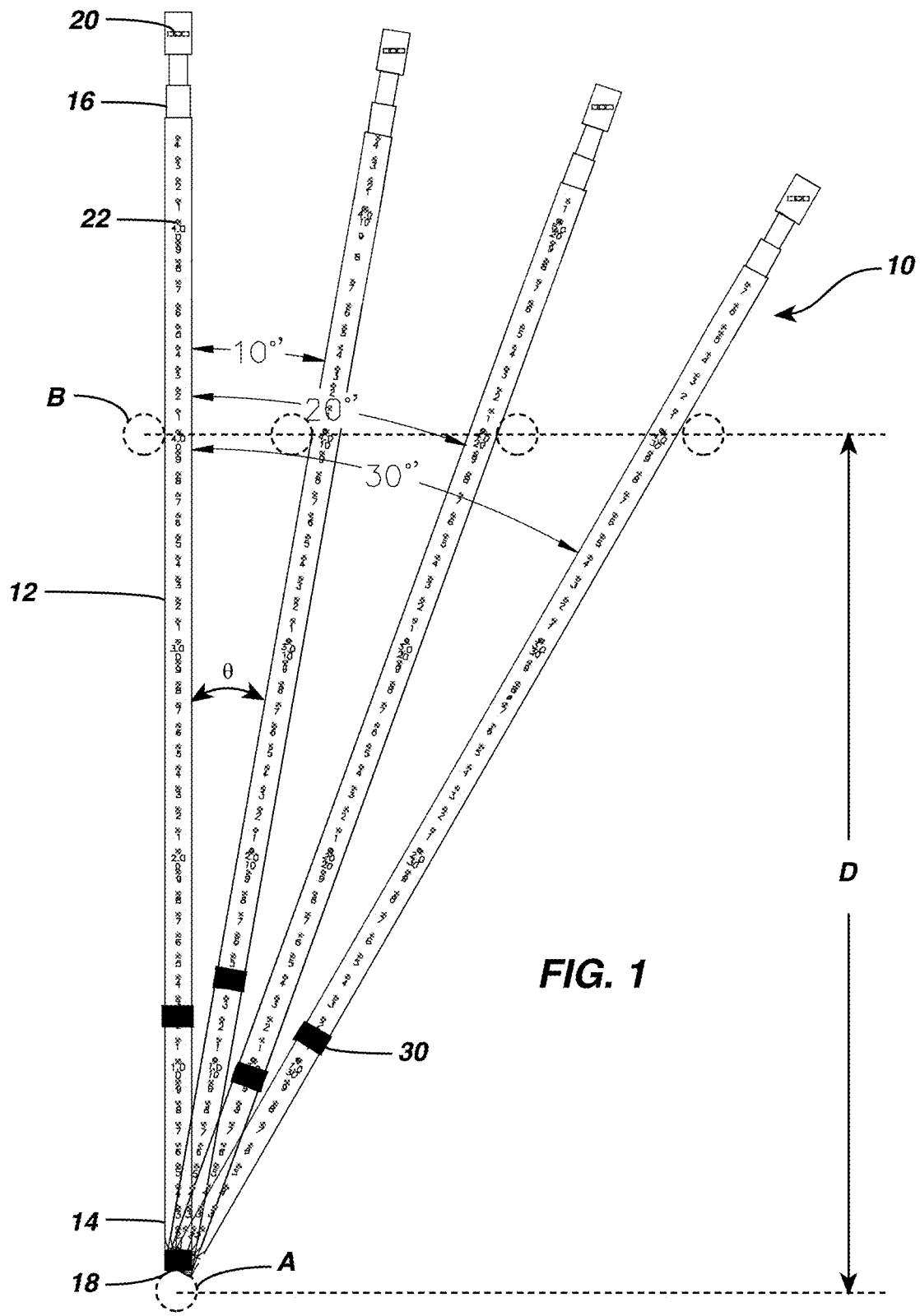
FIG. 1 shows a measurement device oriented at a plurality of angles relative to a first point and a second point according to one embodiment of the present disclosure.

FIG. 1 shows a basic embodiment of a measurement device 10 for measuring a vertical distance between two points when the measurement device 10 is oriented at various angles. The measurement device includes two or more scales printed on the measurement device 10, and each of the scales corresponds to a vertical distance when the measurement device 10 is oriented at a particular angle relative to vertical. The measurement device 10 advantageously allows for the determination of a vertical distance between two points measured by the measurement device 10 while the measurement device is angled 10, thereby allowing for the measurement of a vertical distance between two points that are not vertically aligned.

The measurement device 10 includes an elongate body 12 extending from a first end 14 to a second end 16 that is distal from the first end 14. An end cap 18 is located on the first end 14 of the elongate body 12 and is shaped to contact a surface of a first measurement point. A leveling mechanism 20, preferably a bubble level, is also located on the measurement device 10 and is preferably located on the second end 16 of the elongate body 12.

Figure 2:
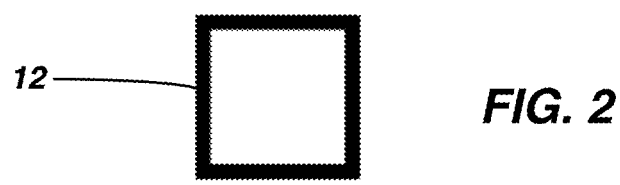
FIG. 2 shows a cross-sectional view of an elongate body of a measurement device according to one embodiment of the present disclosure.
Figure 3:
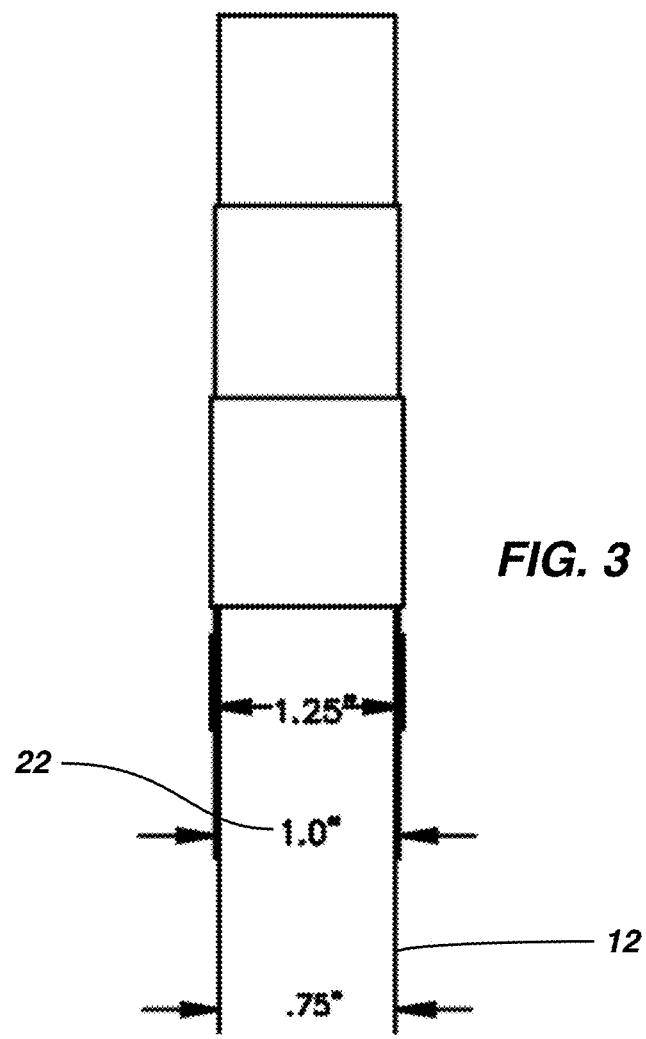
FIG. 3 shows a side view of an elongate body of a measurement device according to one embodiment of the present disclosure.

Referring now to FIGS. 2 and 3, the elongate body 12 is preferably rectangular in shape along a length of the elongate body 12. The elongate body 12 is preferably formed of a rigid material, such as aluminum or other metal, or may be formed of a polymer or other composite material. The elongate body 12 preferably has a length of from about 3 feet to about 25 feet, and more preferably has a length of approximately 15 feet.

A plurality of scales 22 are displayed on sides of the elongate body 12, with each scale corresponding to distances along a length of the elongate body 12 when the measurement device 10 is oriented at a first angle as described in greater detail below. For example, one of the plurality of scales 22 may correspond to a length of the elongate body 12 from the first end 14, wherein each length of the scale corresponds to a same length of the elongate body 12. Other of the plurality of scales 22 may correspond to a vertical distance between a first point along the elongate body 12 and a second point along the elongate body 12 when the measurement device 10 is oriented at one or more angles that are different from the first angle.

As shown in FIG. 1, the leveling mechanism 20 is preferably located on the second end 16 of the measurement device 10. Referring now to FIGS. 4A-4D, the leveling mechanism 20 is preferably formed of a bubble level including a bubble 24 within a liquid medium. An orientation of the leveling mechanism 20 is such that the bubble 24 is aligned within alignment marks 26 when the measurement device 10 is oriented at a particular angle.

Figures 4A, 4B, 4C, 4D:
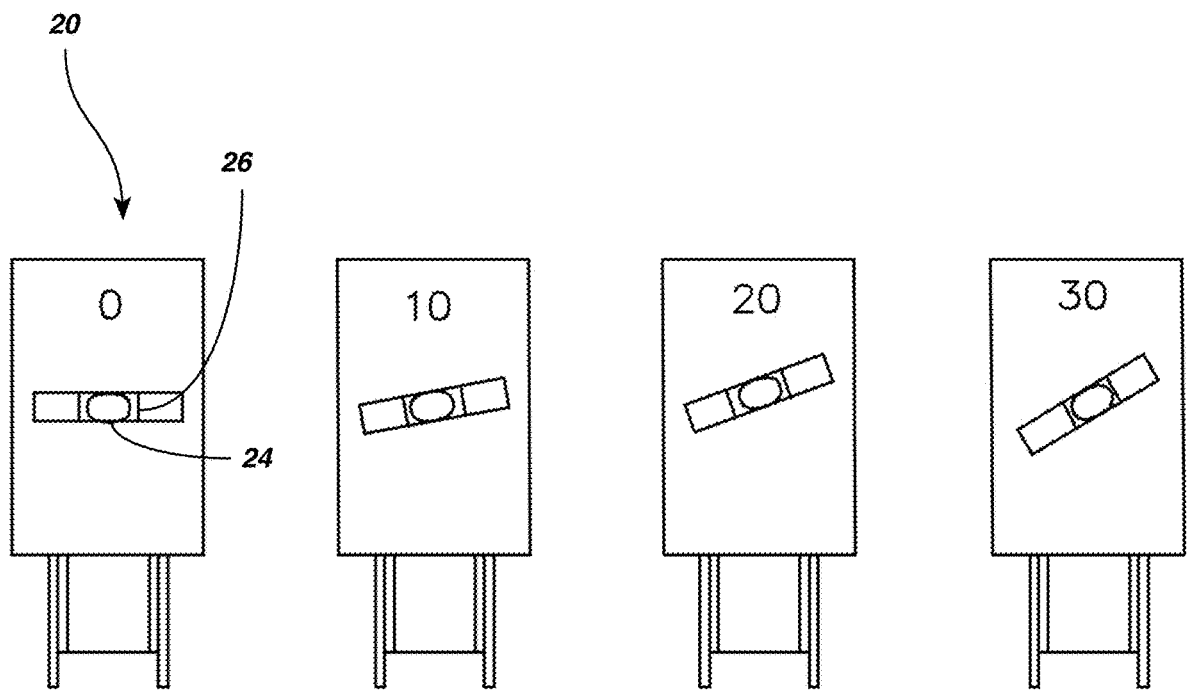
FIGS. 4A-4D show a leveling mechanism including a plurality of bubble levels according to one embodiment of the present disclosure.

The leveling mechanism 20 is configured to show when the device is aligned at one or more angles relative to a vertical position of the measurement device 10. For example, and as illustrated in FIGS. 4A-4D, leveling mechanisms 20 may be located on multiple sides of the second end 16 of the measurement device 10. FIGS. 4A-4D show leveling mechanisms 20 located on each of four sides of the second end 16 of the measurement device 10. Each leveling mechanism 20 is configured such that the measurement device 10 may be aligned at a particular angle. For example, in FIG. 4A the leveling mechanism 20 is configured to indicate when the measurement device 10 is oriented in a substantially vertical position when the bubble 24 is aligned within the alignment marks 26. FIG. 4B shows the leveling mechanism 20 configured to indicate when the measurement device 10 is oriented at an angle of 10° relative to the vertical position of FIG. 4A. Similarly, FIGS. 4C and 4D show leveling mechanisms 20 configured to indicate when the measurement device 10 is oriented at angles of 20° and 30° respectively.

Figure 5D:
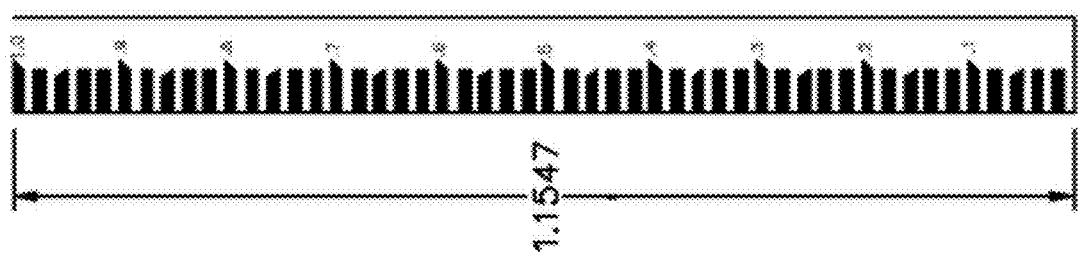
FIGS. 5A-5D show a plurality of scales displaying a vertical distance when the measurement device is oriented at a plurality of angles according to one embodiment of the present disclosure.
Figure 5C:
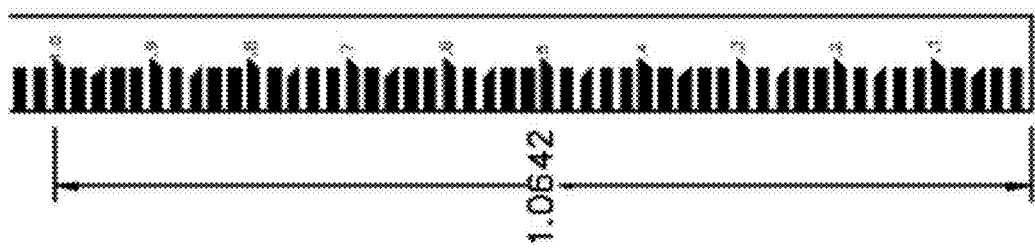
Figure 5B:
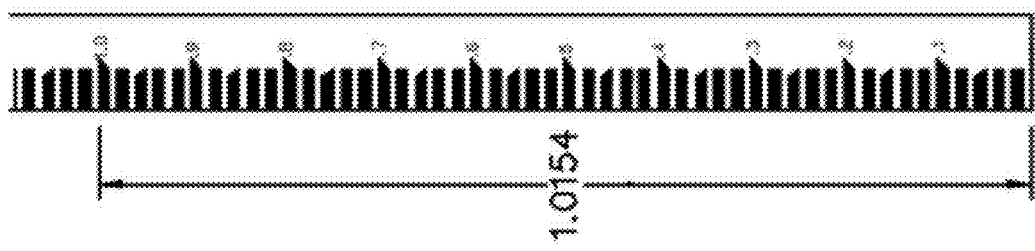
Figure 5A:
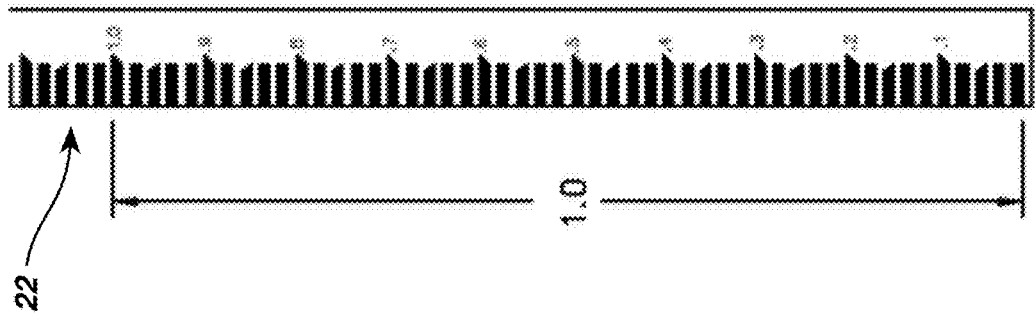

Referring now to FIGS. 5A-5D, the plurality of scales 22 may be located on a side of the measurement device 10 that corresponds to a particular leveling mechanism 20. For example, the scale 22 of FIG. 5A shows vertical distances based on the measurement device 10 being located in a vertical position shown by the leveling mechanism 20 of FIG. 4A. In FIG. 5A, each measurement of 1 vertical foot corresponds to a length of 1 foot on the scale 22.

Additional scales 22 shown on the measurement device 10 are configured to measure a vertical distance between a first point along the measurement device 10 and a second point along the measurement device 10 when the first point and the second point are not vertically aligned. To measure a vertical distances between two points that are not vertically aligned, the measurement device 10 is tilted at one or more designated angles θ. The scales 22 shown on the measurement device 10 include measurements that are based on the one or more designated angles. For example, vertical distances displayed on the scales 22 may be determined based on the one or more designated angles and a length of the measurement device. Measurements displayed on the scale are determined as a function of the cosine of the one or more designated angles θ multiplied by a length of the measurement device, as shown in Equation 1 below. For example, when angle θ is 10°, a length of one foot of vertical distance corresponds to a length of 1.0154 feet along a length of the measurement device.

Vertical distance=cos(θ)*(Distance Along Measurement Device)  Equation 1:

In FIG. 5B, the scale 22 shows vertical distances based on the measurement device 10 being located in the orientation of FIG. 4B wherein the measurement device 10 is angled 10° relative to the vertical position of FIGS. 4A and 5A. The scale 22 of FIG. 5B includes visual markers indicating a vertical distance between a first point along the scale 22 and a second point when the measurement device 10 is angled 10° relative to a vertical position. The visual markers include a distance of 1.0 units of measurement, such as 1 foot, meter, etc. Incremental markers may further be included on the measurement device, such as increments of 0.1 of the unit of measurement. While the measurement device of FIG. 5B shows a unit of 1.0, the actual length on the measurement device is 1.0154 units of measurement. This value is based on Equation 1 above.

The exemplary scales 22 of FIGS. 5C and 5D correspond to vertical distances based on the measurement device 10 being oriented at 20° and 30° respectively. At an angle of 20°, each unit of measurement of a vertical distance corresponds to a length of 1.0642 units of measurement along a length of the measurement device 10. At an angle of 30°, each unit of measurement of a vertical distance corresponds to a length of 1.1547 units of measurement along a length of the measurement device 10.

The measurement device 10 preferably includes four scales 22, with each scale 22 displayed on each of four sides of the elongate body 12 of the measurement device 10. The leveling mechanism 20 is preferably configured such that the measurement device 10 may be oriented at an angle that corresponds to distances shown by the scale 22 on a particular side of the measurement device. In the example of FIG. 1, the leveling mechanism 20 includes bubble levels on each of four sides of the second end 16 of the measurement device, with each bubble level displaying alignment of the measurement device at an angle at each of 0°, 10°, 20°, and 30° relative to vertical. While FIG. 1 shows a plurality of scales 22 and bubble levels on multiple sides of the measurement device 10, it is also understood that embodiments of the measurement device may include multiple scales 22 and leveling mechanisms 20 located in various other positions on the measurement device. For example, multiple scales 22 and one or more leveling mechanisms 20 may all be located on a single side of the measurement device 10. Alternatively, the measurement device 10 may have various other shapes, such as a cylindrical shape, and multiple scales 22 may be shown around an outer diameter of the measurement device 10.

In yet another alternative, in one embodiment the plurality of scales 22 may be displayed on a single side of the elongate body 12 of the measurement device 10. The leveling mechanism 20 may include a plurality of bubble levels formed on sides of the leveling mechanism 20. The leveling mechanism 20 may be rotatively coupled to the elongate body 12 such that the leveling mechanism 20 may be rotated to display one of the plurality of bubble levels depending on an angle of the measurement device 10.

Figure 6:
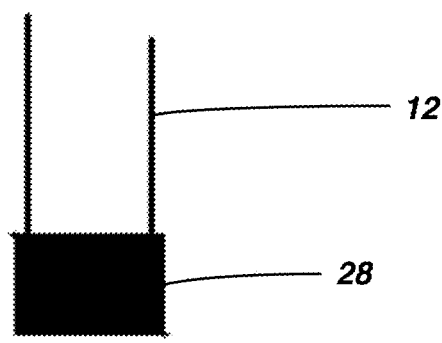
FIG. 6 shows a cap located on the elongate body according to one embodiment of the present disclosure.
Figure 7:
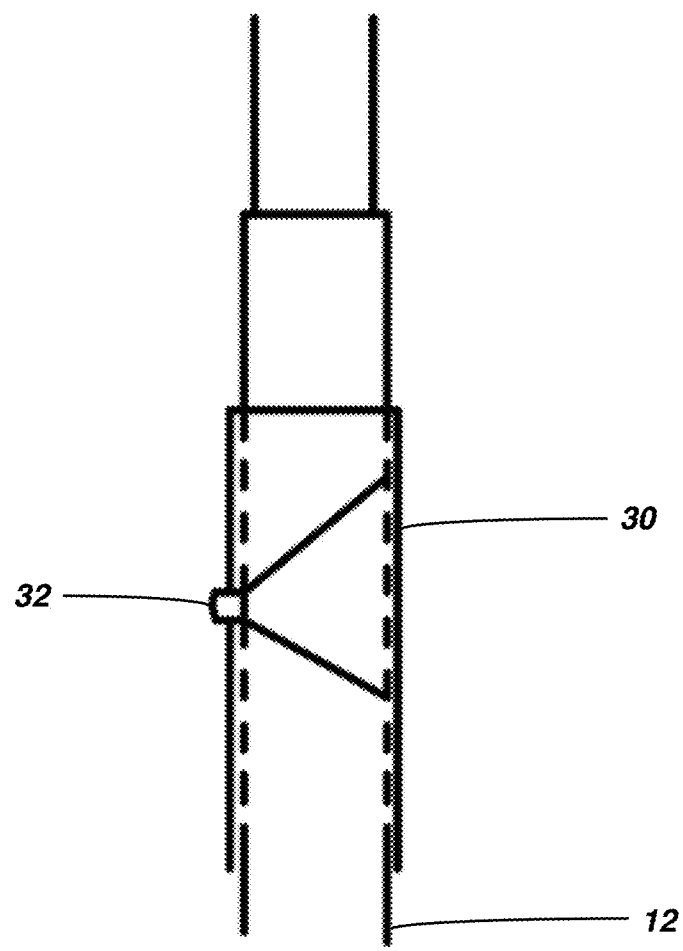
FIG. 7 shows a side view of a bracket according to one embodiment of the present disclosure.

Referring to FIG. 6, the measurement device 10 may further include an end cap 28 located at the first end 14 of the elongate body 12. The end cap 28 may be formed such that the measurement device 10 may be placed into contact with a surface, such as a pipe, for measurement of a vertical distance. The measurement device 10 further preferably includes a sliding bracket 30 located around the elongate body 12 of the measurement device 10. As shown in FIG. 7, the sliding bracket 30 is configured to slide along a length of the elongate body 12 to facilitate marking of a distance along the scale 22 shown on the elongate body 12. The sliding bracket 30 may be frictionally engaged with the elongate body 12 such that a position of the sliding bracket 30 may be fixed along a length of the measurement device 10. For example, the sliding bracket 30 may include a locking button 32 formed through the sliding bracket 30 and into contact with the measurement device 10 to selectively fix a location of the sliding bracket 30.

Figure 8:
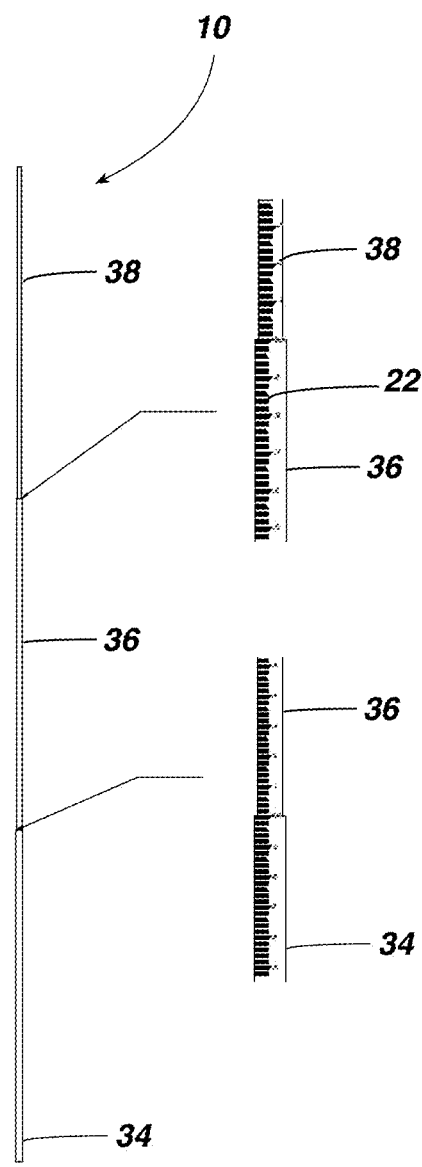
FIG. 8 shows a side view of a telescoping measurement device according to one embodiment of the present disclosure.
Figure 9:
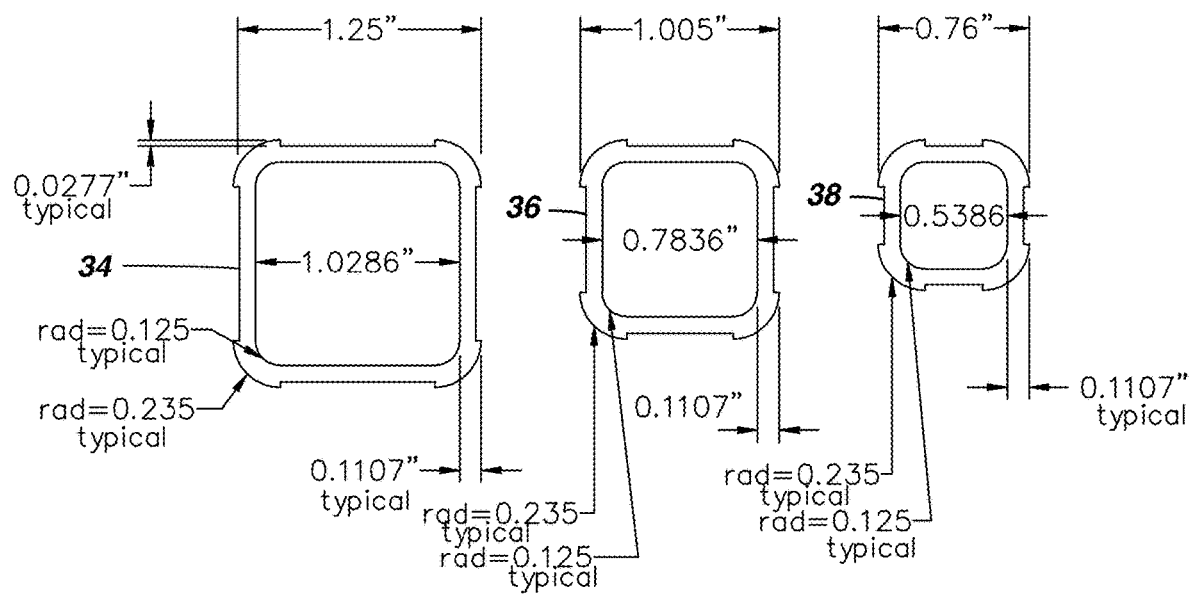
FIG. 9 shows a top-down view of telescoping members of the measurement device according to one embodiment of the present disclosure.

In one embodiment, the measurement device 10 is formed of telescoping members that fit within one another such that the measurement device 10 may be extended in length for measurement and retracted for transportation and storage. Referring now to FIG. 8, the measurement device 10 may be formed of multiple telescoping members 34, 36, and 38. The plurality of scales 22 displayed on the measurement device 10 preferably run continuously along the multiple telescoping members 34, 36, and 38 such that when the telescoping members are fully extended the plurality of scales 22 are shown consecutively on the measurement device 10. FIG. 9 shows a top-down view of the multiple telescoping members 34, 36, and 38. Each of the telescoping members preferably has a similar cross-sectional area such that the telescoping members may fit within one another. Referring again to FIG. 7, the lock 32 may secure a relationship of the multiple telescoping members 34, 36, and 38 relative to one another by extending through one or more bores formed through the multiple telescoping members.

In operation, the measurement device 10 enables measurement of a vertical distance between two points of interest without requiring the measurement device 10 to be oriented vertically, thereby allowing for the measurement of a vertical distance between two points that are not vertically aligned. Referring again to FIG. 1, the measurement device 10 may measure a vertical distance between a first point A and a second point B. When the second point B is directly above the first point A, the scale 22 corresponding to an angle θ of 0° is used to determine a vertical distance D between the first point A and the second point B. When the second point B is offset from the first point A, the measurement device 10 may be angled such that the measurement device 10 is adjacent to both the first point A and the second point B. One or more of the scales 22 may be used based on an angle of the measurement device 10 such that when the measurement device 10 is positioned at an angle, the vertical distance D may be measured on the one or more scales 22.

The measurement device 10 advantageously allows for measurement of a distance between two points that are not aligned, such as two points that are not in vertical alignment. The measurement device 10 may be angled to measure the vertical distance between two points, thereby allowing the measurement device 10 to be used to measure two offset points or to fit the measurement device 10 into a location that the measurement device 10 may otherwise be able to fit in an upright vertical orientation.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A measurement device for measuring a vertical distance between a first point and a second point, the measurement device comprising:
   an elongate body extending from a first end to a second end that is distal from the first end, the elongate body having two or more members telescopically engaged with one another, wherein the measurement device is movable between collapsed and extended positions;
   a leveling mechanism located at the second end of the elongate body, the leveling mechanism configured to orient the measurement device at two or more predetermined angles relative to a vertical orientation of the measurement device;
   two or more scales displaying units of measurement along a length of the elongate body, wherein units of measurement of each of the two or more scales correspond to a vertical distance between the first point and the second point.

2. The measurement device of claim 1, the elongate body having a rectangular cross-sectional area, the measurement device further comprising four scales displaying units of measurement on each side of the elongate body.

3. The measurement device of claim 2, the leveling mechanism comprising four bubble levels with each of the four bubble levels displayed on a respective side of the measurement device, wherein each of the bubble levels corresponds to a particular angle of the measurement device.

4. The measurement device of claim 1, further comprising a sliding bracket slidably located around the elongate body of the measurement device.

5. The measurement device of claim 4, the sliding bracket further comprising a lock for fixing a position of the sliding bracket along a length of the elongate body of the measurement device.

6. The measurement device of claim 1, wherein the two or more scales are consecutively displayed on the two or more telescopically engaged members of the elongate body.

7. The measurement device of claim 1, further comprising a lock extending through at least one of the two or more telescopically engaged members for fixing a position of the telescopically engaged members relative to one another.

8. The measurement device of claim 1, wherein in an extended position the measurement device has a length of from about 12 feet to about 18 feet.

9. A measurement device for measuring a vertical distance between a first point and a second point, the measurement device comprising:

an elongate body extending from a first end to a second end that is distal from the first end, the elongate body comprising two or more members telescopically engaged with one another, wherein the measurement device is movable between collapsed and extended positions;

a leveling mechanism located at the second end of the elongate body, the leveling mechanism configured to orient the measurement device at two or more predetermined angles relative to a vertical orientation of the measurement device;

two or more scales displaying units of measurement along a length of the elongate body, wherein units of measurement of each of the two or more scales correspond to a vertical distance between the first point and the second point and wherein the two or more scales are consecutively displayed on the two or more telescopically engaged members of the elongate body.

10. The measurement device of claim 9, the telescopically engaged members of the elongate body having rectangular cross-sectional areas, the measurement device further comprising four scales displaying units of measurement on each side of the telescopic members of the elongate body.

11. The measurement device of claim 10, the leveling mechanism comprising four bubble levels with each of the four bubble levels displayed on a respective side of the measurement device, wherein each of the bubble levels corresponds to a particular angle of the measurement device.

* * * * *